F. E. & C. F. STANLEY.
METHOD OF CONSTRUCTING A BOILER.
APPLICATION FILED FEB. 3, 1915.

1,200,666.

Patented Oct. 10, 1916.

WITNESSES

INVENTOR
Francis E. Stanley
and Carlton F. Stanley
BY
Richard P. Elliott
ATTY.

UNITED STATES PATENT OFFICE.

FRANCIS E. STANLEY AND CARLTON F. STANLEY, OF NEWTON, MASSACHUSETTS.

METHOD OF CONSTRUCTING A BOILER.

1,200,666.   Specification of Letters Patent.   Patented Oct. 10, 1916.

Application filed February 3, 1915. Serial No. 5,953.

*To all whom it may concern:*

Be it known that we, FRANCIS E. STANLEY and CARLTON F. STANLEY, both of Newton, county of Middlesex, and State of Massachusetts, citizens of the United States, have invented certain new and useful Improvements in Methods of Constructing Boilers, of which the following is a specification, reference being had to the drawings accompanying the same and forming a part thereof.

Our invention relates to improvements in the method of constructing a wrought metal boiler, which consists in forming the shell with one of its heads integral with the shell and of closing the open end of the shell with a second head, with or without a band shrunk upon the outside of the shell opposite said second head, and of thereafter fusing the edge of said second head and the open end of the shell together, when a band is used, of fusing said head, the end of the shell and the band together by heat, such as autogenous welding, or the like, so as to make an integral structure of the shell and its heads, or of the shell, heads and the shrunk on band; of thereafter making openings in the heads and securing in said openings flues by expanding their ends and preferably turning them over on the outside of the heads, and of brazing one or both ends of the tubes to the heads by heating the head or heads and the ends of the tubes to be brazed to the heads of the boiler to approximately 1740 degrees Fahrenheit so as to thoroughly spread and run a brazing compound around the tubes where they contact with the walls of the openings in the heads of the boiler so as to substantially integrally connect the tubes to the boiler head or heads.

Figure 1:
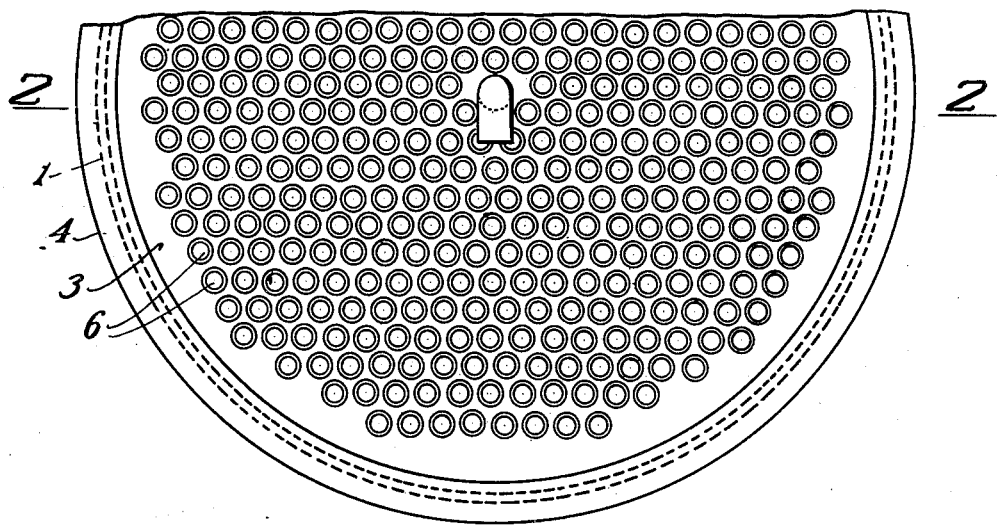
Figure 2:
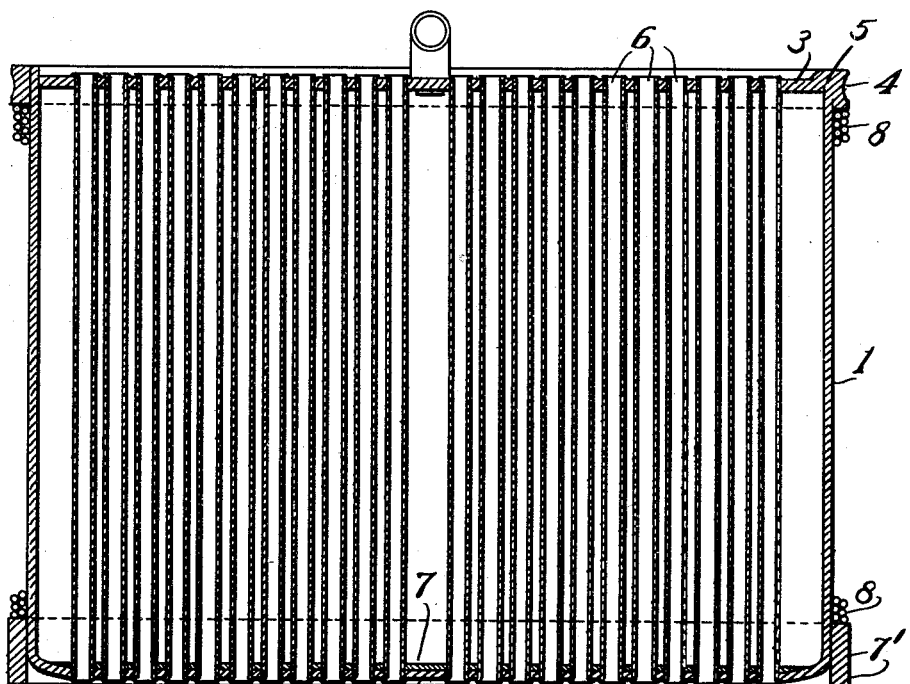

In the drawings which accompany this specification and form a part thereof, Figure 1 is a partial view of one end or head of a boiler constructed according to our method; and Fig. 2 is a sectional elevation through line 2—2 of Fig. 1 illustrating the method of securing the wrought metal parts of the boiler together.

The first step in carrying out the method of our invention consists in drawing a boiler shell 1 and its head 2 so that they will be integral with each other, drill tube holes in the head, clean it and preferably plate it with brass or other suitable metal to form a brazing compound. The next step is to prepare a head 3 and drill the tube holes therein to fit inside the open end of the shell, clean the head and preferably plate it with brass or other suitable metal to form a brazing compound. We then preferably prepare a band 4, slightly smaller than the outside diameter of the shell 1 and shrink it upon the end of the shell opposite the head 3 so as to firmly grip the shell 1 between the outer edge of the head 3 and the inner surface of the band 4. We thereafter preferably unite the shell 1, the head 3 and the band 4 by fusing them together to form an integral joint, preferably by autogenous welding, as illustrated at 5, thus making a substantially integral structure, comprising the shell and the heads of the boiler and the strengthening band surrounding the head which is inserted in the open end of the shell.

The next step is to prepare the tubes 6, 6, etc., of the right length and preferably plate their ends with brass or other suitable metal to form a brazing compound. In cutting the tubes 6, 6, etc., we preferably cut them long enough so the ends will project beyond the exterior surface of the heads a sufficient distance so that they may preferably be expanded into the openings in the heads, and if desired their ends turned or riveted over as is the usual practice. After expanding and riveting in the tubes, we heat the head or heads to be brazed, by a furnace designed so that the head of the boiler may set over it and so that the head and ends of the flues may be heated to a degree of heat approximating 1740 degrees Fahrenheit, which in practice we have found to be about the right degree of heat to properly flow the brazing compound thoroughly around all the tubes and unite them to the walls of the openings in the heads of the boiler.

The layer of brazing is represented by the numeral 7, the thickness of the plating or brazing compound being enlarged or exaggerated to more clearly illustrate our method.

In practice, we preferably braze the tubes in but one of the heads of the boiler; *i. e.*, the head contiguous to the fire-box or furnace attached to the boiler when in use. We preferably use the integral end of the boiler as the fire-box end and braze the tubes in that end. After the tubes are brazed in we preferably shrink a band 7' upon the outside of the shell opposite the integral end of the boiler so as to strengthen it, and thereafter wind the shell 1 of the boiler between the bands 4 and 7 with layers of wire 8, preferably piano wire of high tensile strength, so as to strengthen the shell of the boiler in order that it may withstand a high pressure.

Having thus fully described our invention, what we claim as new and desire to secure by Letters Patent of the United States, is—

1. The method of constructing a wrought metal boiler which consists in forming the shell with one of its heads integral therewith, making flue openings in said integral head, forming a second head with flue openings formed therein and closing the open end of said shell with said second head, shrinking a band on the outside of the shell of said second head, fusing said second head, the end of the shell and said band together by autogenous welding, preparing flues for said boiler by plating their ends with a suitable brazing metal, securing the flues in said openings by expanding the ends thereof and further securing the flues by subjecting the head or heads of the boiler and the flue ends therein to a degree of heat of approximately 1740 degrees Fahrenheit to melt a brazing compound so it will flow around and adhere to the flues and walls of the flue openings to unite the flues to the flue openings in the boiler head.

2. The method of constructing a wrought metal boiler which consists of forming the shell with one of its heads integral therewith, making flue openings in said integral head, forming a second head with flue openings formed therein and closing the open end of said shell with said second head, shrinking a band on the outside of the shell of said second head, fusing said second head, the end of the shell and said band together by autogenous welding, preparing flues for said boiler by plating their ends with a suitable brazing metal, securing the flues in said openings by expanding the ends thereof and further securing the flues by subjecting the head or heads of the boiler and the flue ends therein to a degree of heat of approximately 1740 degrees Fahrenheit to melt a brazing compound so it will flow around and adhere to the flues and walls of the flue openings to unite the flues to the flue openings in the boiler head, shrinking a band on the outside of the shell opposite the integral head of the boiler, and thereafter winding a plurality of layers of wire around the outside of the shell between both said bands and securing the ends of the wire to the boiler.

In testimony whereof, we have hereunto set our hands, in the presence of two subscribing witnesses, this the 28th day of January, A. D. 1915.

FRANCIS E. STANLEY.
CARLTON F. STANLEY.

Witnesses:
PRESCOTT WARREN,
GEORGE E. WALLACE.